United States Patent [19]

Kasuya

[11] 4,410,960
[45] Oct. 18, 1983

[54] SORTING CIRCUIT FOR THREE OR MORE INPUTS

[75] Inventor: Yoshihiro Kasuya, Tokyo, Japan

[73] Assignee: Nippon Electric Co., Ltd., Tokyo, Japan

[21] Appl. No.: 232,052

[22] Filed: Feb. 5, 1981

[30] Foreign Application Priority Data

Feb. 5, 1980 [JP] Japan ............................... 55-12746
Feb. 5, 1980 [JP] Japan ............................... 55-12747
Feb. 5, 1980 [JP] Japan ............................... 55-12749

[51] Int. Cl.³ ............................................. G06F 7/00
[52] U.S. Cl. ................................. 364/900; 340/146.2
[58] Field of Search ..................... 364/900, 200; 340/146.2

[56] References Cited

U.S. PATENT DOCUMENTS

| | | | |
|---|---|---|---|
| 2,984,822 | 5/1961 | Armstrong et al. | 364/900 X |
| 2,984,824 | 5/1961 | Armstrong et al. | 364/900 |
| 3,418,632 | 12/1968 | Batcher | 340/146.2 |
| 3,428,946 | 2/1969 | Batcher | 340/146.2 |
| 3,587,057 | 6/1971 | Armstrong | 364/900 |

*Primary Examiner*—David H. Malzahn
*Attorney, Agent, or Firm*—Sughrue, Mion, Zinn, Macpeak & Seas

[57] ABSTRACT

A sorting circuit for sorting three inputs representative of numerical values into first through third outputs representative of the values in the ascending order, checks three binary bits of input sequences supplied thereto at a time from the most significant bit. When only one of the three checked bits is found to be logic "0" and logic "1" for the first time, the sequence including the only one bit represents the minimum and the maximum, respectively. As soon as only one of two bits of the sequences except for the sequence representative of the minimum is subsequently found to be logic "1," the sequence including the only one subsequently found bit represents the maximum. In this manner, the circuit produces the outputs. It is possible to form an array of such three-input-output sorting circuits and conventional two-input-output sorting circuits for use in sorting a multiplicity of inputs. A similar array can be formed for inputs, an integral multiple of four in number, by four-input-output sorting units, each supplied with two sets of ascendingly ordered inputs. The inputs are supplied to the array through a plurality of two-input-output sorting units. The last-mentioned sorting circuit can be formed to be operable either in bit series or in bit parallel.

8 Claims, 21 Drawing Figures

FIG. 12
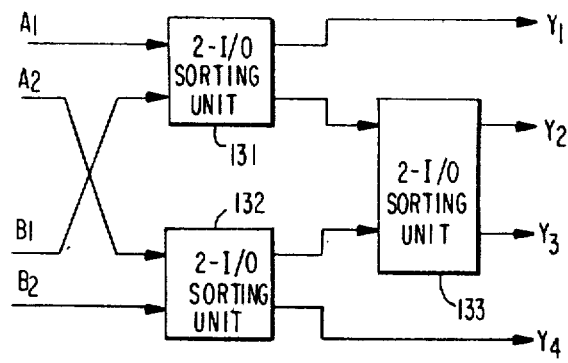
FIG. 14
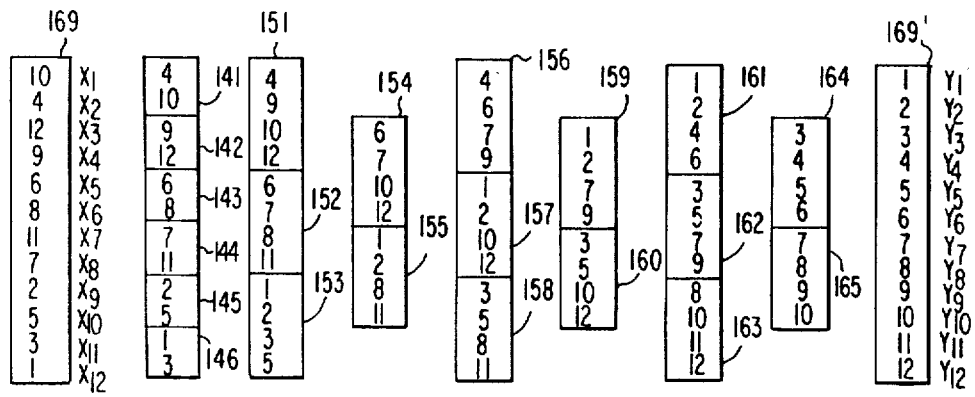
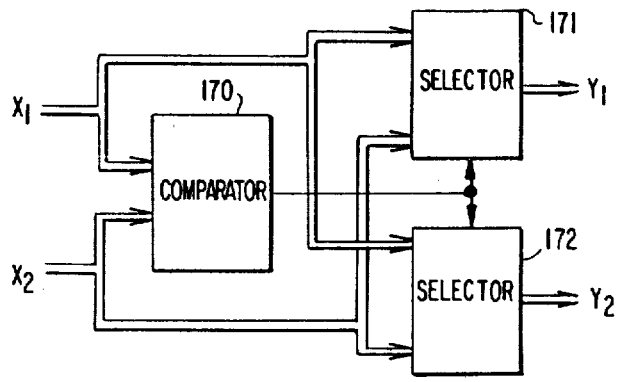
FIG. 15

SORTING CIRCUIT FOR THREE OR MORE INPUTS

BACKGROUND OF THE INVENTION

This invention relates to a sorting or ordering circuit or circuit arrangement for sorting three or more inputs, representative of numerical values, into outputs, equal in number to the inputs, with the outputs arranged to represent the numerical values either in the ascending or the descending order. Inasmuch as the descending order is equivalent to the ascending order in this context, the sorting circuit will be described with respect to the ascending order alone. Some of the inputs may have the same value. The wording "the ascending order" is therefore used to mean both monotonously increasing and decreasing orders. According to the number of inputs or outputs, such a circuit is referred to as a two-input-output sorting circuit, a three-input-output sorting circuit, or the like. The inputs and the outputs will be called input values and output values, although such values may be allotted to alphabets and the like so that the inputs and the outputs may represent, for example, the alphabets. Such a sorting circuit is useful, although not restricted, specifically in an electronic data handling system.

As will later be described with reference to one of fifteen figures of the accompanying drawing, it is possible to manufacture a three-input-output sorting circuit by using three two-input-output sorting circuits as sorting units arranged in three stages. A four-input-output sorting circuit is composed of five two-input-output sorting units arranged also in three stages. At any rate, a certain period dependent on the number of binary bits representative of each input or output value is necessary for a two-input-output sorting unit to provide the output values when each value is represented by a time sequence of such binary bits. It takes therefore three periods to sort three or four input values into the output values. For the input values, more than four in number, the time required becomes terrible. The sorting circuit becomes bulky.

SUMMARY OF THE INVENTION

It is therefore an object of the present invention to provide a three-input-output sorting circuit operable with a period equal to that necessary for a two-input-output sorting circuit.

It is another object of this invention to provide a three-input-output sorting circuit of the type described, which is compact.

It is a further object of this invention to provide a sorting circuit for a multiplicity of input values, which is operable as short a time as possible and yet is compact.

According to an important embodiment of this invention, there is provided a sorting circuit for sorting three input values into first through third ascendingly ordered output values wherein the input values are represented by three input sequences, respectively, and the first through the third output values are represented by first through third output sequences, respectively, with each of the input and the output sequences given by a time sequence having a prescribed number of binary bits, each having either of a logic "0" and a logic "1" level at a time, arranged from the most significant bit to the least significant bit so that the input and the output sequences may have corresponding bits. The sorting circuit comprises state specifying means for specifying one of an initial state, six first-level states, and six second-level states at a time. Two first-level states are allotted to each input value. Each first-level state is accompanied by two second-level states with the two second-level states assigned to two first-level states including that each first-level state, respectively, so that each second-level state may indicate a particular order among the input values. The initial state is a state in which the order of the input values is not yet definite. Each first-level state is another state in which the order is determined for only one input value. Each of the two second-level states accompanying the last-mentioned first-level state is still another state in which the order is determined for two input values except for the only one input value. The sorting circuit further comprises means for resetting the state specifying means into the initial state and checking and driving means coupled to the state specifying means for checking three corresponding bits of the respective input sequences from time to time to drive, when only one bit is checked to have one of the logic "0" and the logic "1" levels with the two binary bits corresponding thereto checked to have the other of the logic "0" and the logic "1" levels for the first time after the state specifying means is reset to the initial state, the state specifying means from the initial state to one of the first-level states that is predetermined according to the input sequence in which the only one bit is present. The checking and driving means subsequently drives the state specifying means from the one first-level state to one of the two second-level states accompanying that one first-level state when a particular bit and the binary bit corresponding thereto of two input sequences except for the input sequence in which the only one bit is present are checked to have a predetermined one and the other of the logic "0" and the logic "1" levels, respectively, for the first time after the state specifying means is driven into one first-level state. The sorting circuit still further comprises an output circuit coupled to the state specifying means for arranging the input sequences into the first through the third output sequences according to the initial state, the one first-level state, and the one second-level state.

According to another important embodiment of this invention, there is provided a sorting circuit for sorting n input values into first through n-th ascendingly ordered output values where n represents a predetermined natural number. The sorting circuit comprises an array of two-input-output sorting units and three-input-output units. Inasmuch as the three-input-output sorting circuit according to the above-specified embodiment provides the output values in a period equal to that necessary for a two-input-output sorting circuit, it is possible to compose the array.

According to still another important embodiment of this invention, there is provided a sorting circuit for sorting 4n circuit input values into first through 4n-th circuit output values where n represents a natural number except for unity. The sorting circuit comprises an array of the above-described type. The array comprises four-input-output sorting units, each of which is somewhat different from the two-input-output sorting circuit or unit and the three-input-output sorting circuit or unit described hereinabove in that the four-input-output sorting unit should be supplied with unit input values arranged in two sets with two unit input values ascendingly ordered in each set. The circuit input values are therefore supplied to the array through a plurality of two-input-output sorting units. It is possible to provide the sorting circuit so as to be operable with each circuit input value given by a bit-parallel binary sequence.

BRIEF DESCRIPTION OF THE DRAWING

FIGS. 5A through E are schematic diagrams for illustrating operation of the sorting circuit shown in FIGS. 3(a) and (b) by a numerical example;

FIG. 12 is a block diagram of a four-input-output sorting unit;

FIG. 14 is a schematic diagram for illustrating operation of the sorting circuit illustrated in FIG. 13 by a numerical example; and FIG. 15 is a block diagram of a two-input-output sorting circuit which may be used in the sorting circuit illustrated in FIG. 13.

DESCRIPTION OF THE PREFERRED EMBODIMENTS

Figure 1:
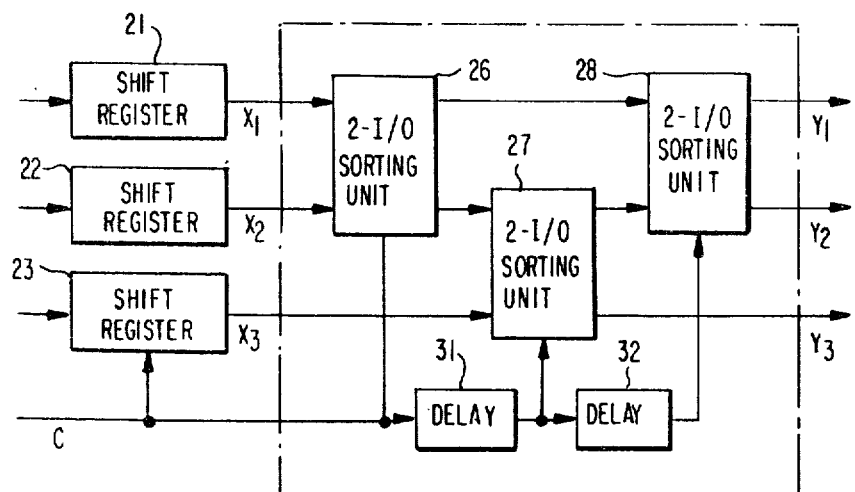
FIG. 1 is a block diagram of a conventional three-input-output sorting circuit.

Referring to FIG. 1, a conventional ordering circuit arrangement for ordering first through third input values $X_1$, $X_2$, and $X_3$ into first through third ascendingly ordered output values $Y_1$, $Y_2$, and $Y_3$, will be described at first in order to facilitate an understanding of the present invention. Merely for simplicity of description, it will be presumed unless otherwise specified in the following description that each of the input and the output values is represented by a time sequence of a prescribed number of binary bits, each representative of a logic "0" or a logic "1" level at a time. In other words, each sequence has a prescribed word length. The sequences representative of the input and the output values will be called first through third input and output sequences and denoted by $X_1$ through $X_3$ and $Y_1$ through $Y_3$ by the reference symbols indicative of the respective values. It will also be presumed that the binary bits are arranged in each sequence from the most significant bit to the least significant bit. The input and the output sequences therefore have corresponding bits.

The circuit arrangement comprises first through third shift registers 21, 22, and 23 and a three-input-output sorting circuit 25. Each shift register has shift register stages of the prescribed number for retaining each input sequence at first. Responsive to clock pulses C of a sequence, the shift registers 21 through 23 concurrently supply the first through the third input sequences $X_1$ to $X_3$ to the sorting circuit 25 bit by bit through three input leads, respectively. Merely for simplicity of illustration, the clock pulses C are supplied to the third shift register 23 by way of example.

The sorting circuit 25 comprises first through third two-input-output sorting units 26, 27, and 28, each having two input leads and a smaller and a greater value output lead depicted at the top and the bottom, respectively. The first sorting unit 26 is for sorting the first and the second input sequences $X_1$ and $X_2$ under the control of the clock pulses C into a first and a second sorted signal representative of the smaller and the greater of the first and the second input values. The first and the second sorted signals are supplied to the smaller and the greater value output leads, respectively. A first delay circuit 31 is for giving the sequence of clock pulses C a predetermined delay of, for example, the prescribed word length to produce a first delayed clock pulse sequence. Likewise controlled by the first delayed clock pulse sequence, the second sorting unit 27 compares the third input value $X_3$ with the greater of the first and the second input values to supply its smaller and greater value output leads with the smaller and the greater of the compared values. A second delay circuit 32 is for giving the predetermined delay to the first delayed clock pulse sequence to provide a second delayed clock pulse sequence. Responsive to the second delayed clock pulse sequence, the third sorting unit 28 compares the smaller of the first and the second input values with the smaller of the third input value and the greater of the first and the second input values. The third sorting unit 28 supplies the smaller and the greater of the compared values to the smaller and the greater value output leads thereof.

The values obtained at the smaller value output lead of the third sorting unit 28 and the greater value output lead of the second sorting unit 27, provide the first and the third output values $Y_1$ and $Y_3$, respectively. The value derived at the greater value output lead of the third sorting unit 28, provides the second output value $Y_2$. The output leads for the first through the third output values $Y_1$ to $Y_3$ may be called minimum, medium, and maximum output leads, respectively.

The output values $Y_1$ through $Y_3$ may be substituted for the input values $X_1$ through $X_3$ in the shift registers 21 through 23, respectively. It may be mentioned here that the sorting is carried out in periods by the first through the third sorting units 26 to 28. It is therefore possible to carry out the substitution by using the clock pulses C as shift pulses at the end portion of the third period during which the sorting is carried out by the third sorting unit 28.

It is clear that the sorting units 26 through 28 can be connected to the shift registers 21 through 23 differently. For example, the first sorting unit 26 may be connected either to the second and the third shift registers 22 and 23 or to the third and the first shift registers 23 and 21. Such different arrangements of the sorting units 26 through 28 are equivalent to one another. In any event, the circuit arrangement has the defects pointed out heretobefore.

Figure 2:
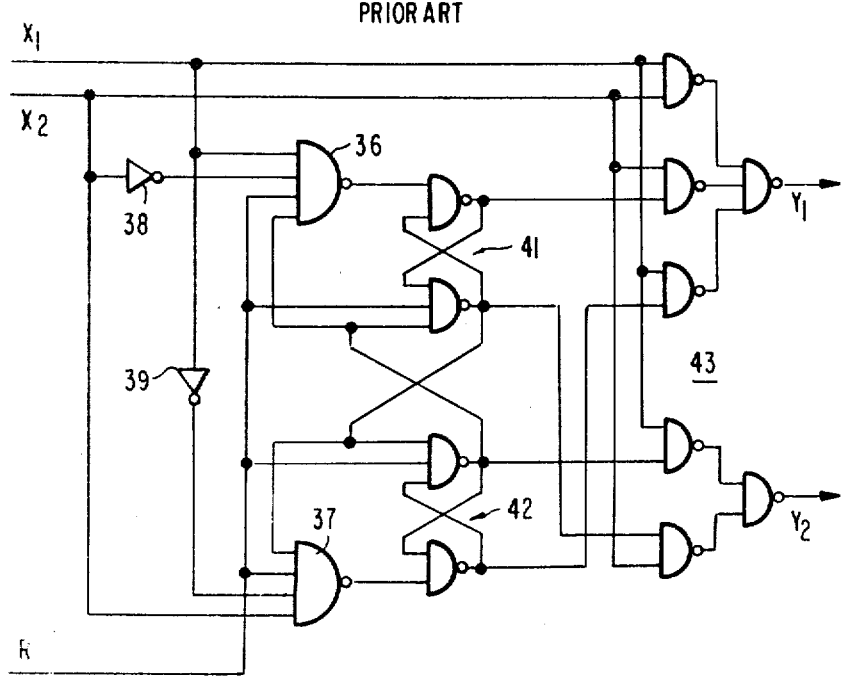
FIG. 2 is a circuit diagram of a two-input-output sorting unit used in the sorting circuit illustrated in FIG. 1.

Turning to FIG. 2, each of the two-input-output sorting units 26 through 28 will briefly be described. A reset signal R is supplied to the sorting unit before operation of the circuit arrangement illustrated with reference to FIG. 1. The sorting unit comprises first and second NAND gates 36 and 37 supplied with the reset signal R and with two input sequences, such as $X_1$ and $X_2$, each directly and through one of two inverters 38 and 39. First and second set-reset flip-flops 41 amd 42, each comprising NAND gates, are supplied with reset signal R and connected to the respective NAND gates 36 and 37 as shown.

At first, the flip-flops 41 and 42 are reset into an initial state with the reset signal R given the logic "0" level. When the reset signal R is turned to the logic "1" level, the NAND gates 36 and 37 are enabled to check two corresponding bits of the respective input sequences from time to time and to drive the flip-flops 41 and 42 to various states indicative of equality of the two checked bits and the facts that one of the two checked bits is smaller and greater than the other. Conditioned by the states of flip-flops 41 and 42, an output circuit 43 comprising NAND gates supplies the smaller and the greater value output leads bit by from the most significant bit to the least significant bit one and the other of the two input sequences representative of smaller and greater values $Y_1$ and $Y_2$.

Figure 3A:
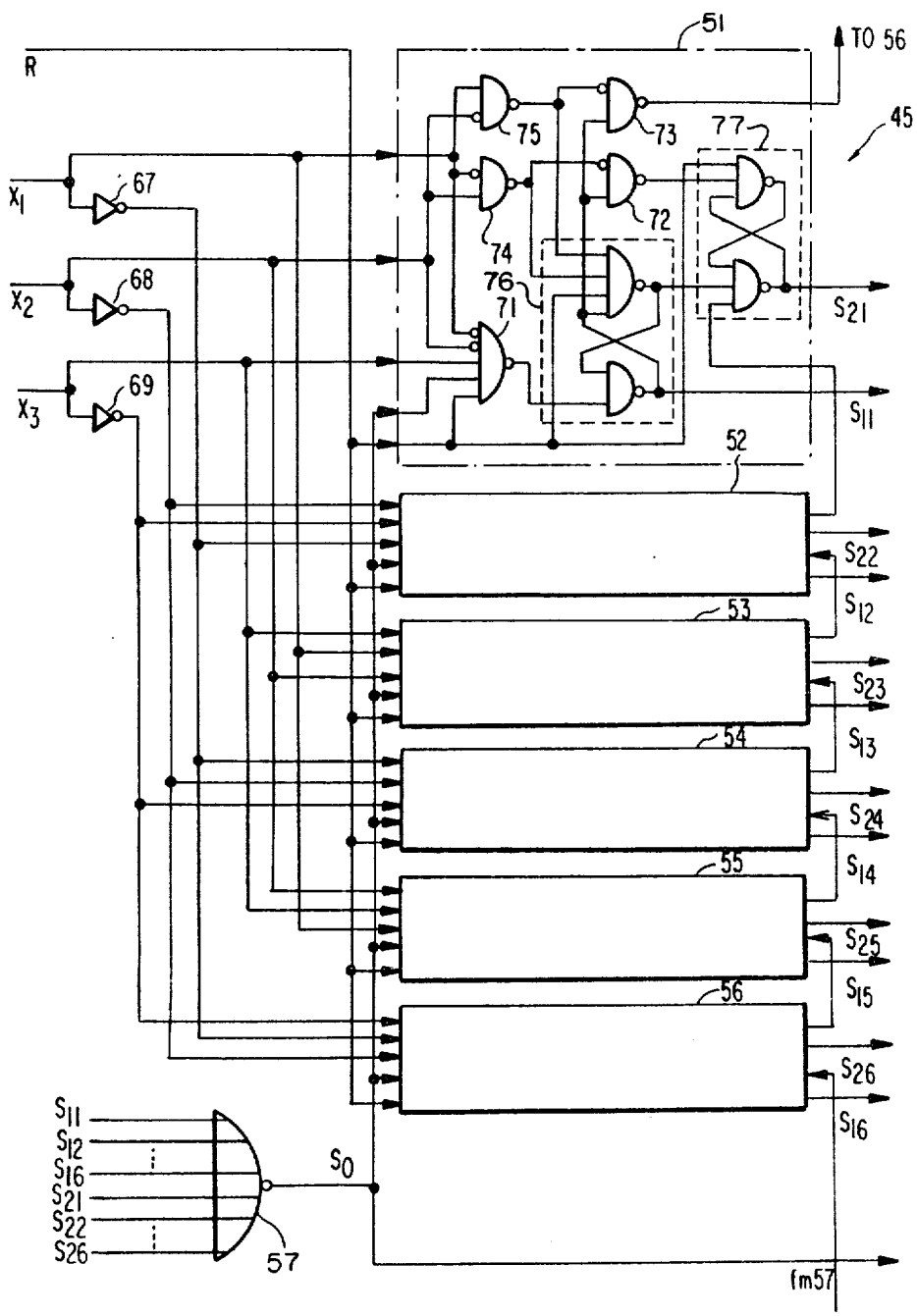
FIGS. 3(a) and (b) show, when connected together at signal lines indicated by like reference symbols, a block diagram of a three-input-output sorting circuit according to a first embodiment of the instant invention.

Referring now to FIGS. 3(a) and (b), an ordering circuit arrangement according to a first embodiment of this invention is for ordering the first through the third input values $X_1$ to $X_3$ into the first through the third output values $Y_1$ to $Y_3$, all of the type described in conjunction with FIG. 1. The circuit arrangement comprises the shift registers 21 through 23 as depicted in FIG. 1 and a novel three-input-output sorting circuit 45. As will become clear as the description proceeds, ordering is carried out substantially on a real time basis in response to clock pulses C of a sequence as in FIG. 1 and a reset signal R as in FIG. 2. The clock pulses C may be used as the shift pulses for the shift registers 21 through 23.

As shown in FIG. 3(a), the sorting circuit 45 comprises first through sixth blocks 51, 52, 53, 54, 55, and 56, each comprising a memory unit and a driving unit for driving the memory unit. The memory and the driving units of the blocks 51 through 56 will collectively be named a memory circuit and a driving circuit. Responsive to the reset signal R, the driving circuit checks the input sequences $X_1$ through $X_3$ bit by bit to determine at first the order of only one input value among the three. More particularly, either the maximum or the minimum of the input values is determined at first. Subsequently, the driving circuit decides the order of the two remaining input values.

Figures 4, 5:
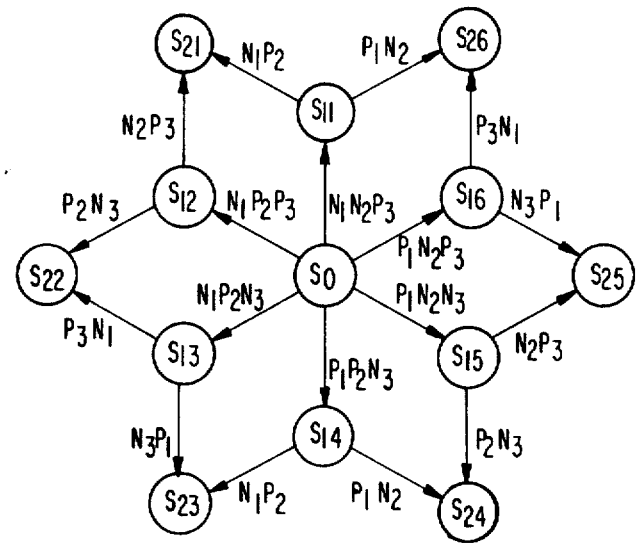
FIG. 4 is a transition diagram for various states which a memory circuit assumes in the sorting circuit illustrated in FIGS. 3(a) and (b)

Turning to FIG. 4 for a short while, the principles on which the sorting circuit 45 is operable will be described. The memory circuit is capable of assuming one of thirteen states consisting of an initial state $S_0$, first through sixth first-level states $S_{11}$ to $S_{16}$, and first through sixth second-level states $S_{21}$ to $S_{26}$. When supplied with the reset signal R, the memory circuit is reset into the initial state $S_0$ from any one of the thirteen states, the initial state $S_0$ inclusive. Operation of the sorting circuit 45 begins, starting from the initial state $S_0$.

It is convenient to understand that the check of the input values is carried out by the driving circuit with each input sequence divided into a first-checked and a remaining part, each consisting of one or more binary bits. Inasmuch as the check proceeds bit by bit concurrently for the input sequences, the first-checked parts of the respective input sequences should have a common number of bit or bits. This applies to the remaining parts.

While all the bits supplied from the respective shift registers 21 through 23 to the driving circuit have either the logic "0" or the logic "1" level, it is impossible to determine the order of the input values. The minimum of the input values is found when a binary bit of the logic "0" level first appears only in one of the first-checked parts. The maximum is decided when a logic "1" bit appears in only one of the first-checked parts for the first time. In either event, the memory circuit is driven from the initial state $S_0$ to one of the first-level states $S_{11}$ through $S_{16}$.

It is now possible by checking the remaining parts of the two remaining input sequences to order the two remaining input values and consequently the three input values. Each first-level state is therefore accompanied by two of the second-level states $S_{21}$ through $S_{26}$ with each of such two second-level states being associated with two first-level states so that each second-level state may indicate a particular order of the three input values. When a logic "0" and a logic "1" bit appear for the first time in the two remaining parts, the input sequence including the former remaining part represents a smaller input value than the other input sequence. If the order of the two remaining input values is thus decided after the memory circuit is driven into a specific one of the first-level states $S_{11}$ through $S_{16}$, the memory circuit is further driven from the specific first-level state to one of the two accompanying second-level states. If not, the memory circuit remains in the specific first-level state. The memory circuit thus serves as a state specifying means and the driving circuit, as a checking and driving means.

Those parts of the first through the third input sequences, each of which consists of one or more binary bits, will be called logic "1" parts and indicated by $P_1$ through $P_3$ either when a first-checked part has a logic "1" bit at the least significant bit thereof or when the remaining part of one of two remaining input sequences has a logic "1" bit therein for the first time with the remaining part of the other input sequence given a logic "0" bit at the concurrently produced bit. When the least significant bit of a first-checked part is of the logic "0" level, such parts of the input sequences will be referred to as logic "0" parts and designated by $N_1$ through $N_3$. This applies to the remaining parts of the respective input sequences if the remaining part in question has a logic "0" bit at a certain bit while the remaining part of the other input sequence has a logic "1" bit at the corresponding bit.

As soon as the check shows that only one of the three first-checked parts is either a logic "0" or a logic "1" part, the driving circuit drives the memory circuit from the initial state $S_0$ to one of the first-level states $S_{11}$ through $S_{16}$. In the meantime, the memory circuit is kept in the initial state $S_0$. The input sequence including the only the logic "0" and the only one logic "1" parts, represents the minimum and the maximum of the input values, respectively. It is thus possible to compare the three input values. In the example illustrated in FIG. 3, transition from the initial state $S_0$ to the first through the sixth first-level states $S_{11}$ to $S_{16}$ occurs when the first-checked parts are $N_1N_2P_3$, $N_1P_2P_3$, $N_1P_2N_3$, $P_1P_2N_3$, $P_1N_2N_3$, and $P_1N_2P_3$, respectively. The minimum and the maximum of the input values should be sorted as the first and the third output signals $Y_1$ and $Y_3$, respectively. It is no longer necessary to check the remaining part of the input sequence representative of the minimum or the maximum.

When one and the other of the two remaining parts are a logic "0" and a logic "1" parts, the value represented by that one remaining part is smaller than the other. With this, the input values $X_1$ through $X_3$ are sorted into the output values $Y_1$ through $Y_3$. The driving circuit drives the memory circuit from a specific one of the first-level states $S_{11}$ through $S_{16}$, into which the memory circuit is driven at first, to either of the two second-level states which accompany the specific first-level state. Meanwhile, the memory circuit is kept in the specific first-level state. By way of example, let the third input value be determined as the maximum. The memory circuit is put in the first first-level state $S_{11}$. Transition occurs from this specific first-level state $S_{11}$ to the first and the sixth second-level states $S_{21}$ and $S_{26}$ when the remaining parts of the first and the second input sequences are $N_1P_2$ and $P_1N_2$, respectively. When the memory circuit is put in the first second-level state $S_{21}$, the first and the second input values $X_1$ and $X_2$ are sorted as the first and the second output values $Y_1$ and $Y_2$, respectively. When the memory circuit is switched into the sixth second-level state $S_{26}$, the first and the second input values $X_1$ and $X_2$ are classified into the second and the first output values $Y_2$ and $Y_1$, respectively. Transition from the other first-level states $S_{12}$ through $S_{16}$ to the second-level states $S_{21}$ through $S_{26}$ occurs as exemplified in FIG. 4.

Referring back to FIGS. 3(a) and (b), the memory circuit turns first through sixth first-level signals $S_{11}$ to $S_{16}$ (designated by the same reference symbols), only one at a time, from the logic "0" level to the logic "1" level when put in the first through the sixth first-level states $S_{11}$ to $S_{16}$, respectively. The memory circuit similarly switches first through sixth second-level signals $S_{21}$ to $S_{26}$ when put in the first through the sixth second-level states $S_{21}$ to $S_{26}$, respectively. When the memory circuit is put in the initial state $S_0$, all the first-level and the second-level signals are given the logic "0" level. Responsive to such logic "0" signals, a NOR circuit 57 gives an initial-state signal $S_0$ the logic "1" level. The first-level signal turned to the logic "1" level, is preferably switched back to the logic "0" level when one of the second-level signals is given the logic "1" level.

As depicted in FIG. 3 (b), the sorting circuit 45 comprises an output circuit comprising, in turn, first through third output units 61, 62, and 63 and an AND circuit 64. Controlled by the initial-state signal $S_0$, the first-level signals $S_{11}$ through $S_{16}$, and the second-level signals $S_{21}$ through $S_{26}$, the output circuit produces the input values $X_1$ through $X_3$ as the output values $Y_1$ through $Y_3$. More particularly, let the initial-state signal $S_0$ and all the first-level and the second-level signals $S_{11}$ through $S_{16}$ and $S_{21}$ through $S_{26}$ be kept in the logic "1" and the logic "0" levels, repectively, when certain parts of the respective input sequences $X_1$ through $X_3$ are checked at first. The output circuit may produce each of these parts as the corresponding part of whichever of the first through the third output sequences $Y_1$ to $Y_3$. When the second, the sixth, and the fourth first-level signals $S_{12}$, $S_{16}$, and $S_{14}$ are given the logic "1" level, the binary bit delivered from the first through the third shift registers 21 to 23 is produced by the output circuit as the corresponding bit of the first output sequence $Y_1$, respectively. When fifth, the third, and the first first-level signals $S_{15}$, $S_{13}$, and $S_{11}$ are made to have the logic "1" level, the binary bit supplied from the first through the third shift registers 21 to 23 is produced as the corresponding bit of the third output sequence $Y_3$, respectively. The binary bit simultaneously derived from each of two remaining shift registers has either the logic "1" or the logic "0" level. The binary bit may be produced by the output circuit as the corresponding bit of whichever of the two remaining output sequences.

Let, for instance, the first first-level signal $S_{11}$ be turned to the logic "1" level at first. The check proceeds to the remaining bit or bits of each of the second and the third input sequences. The output circuit may produce the subsequently checked part of the second or the third input sequence as the corresponding part of whichever of the first and the second output sequences before one of the first and the sixth second-level signals $S_{21}$ and $S_{26}$ is switched to the logic "1" level. The bits delivered from the second and the third shift registers 22 and 23 are produced as the corresponding bits of the first and the second output sequences $Y_1$ and $Y_2$ respectively, when the first second-level signal $S_{21}$ is given the logic "1" level.

The bits delivered from the second and the third shift registers 22 and 23 are produced as the corresponding bits of the second and the first output sequences $Y_1$ and $Y_2$, respectively, when the sixth second-level signal $S_{26}$ is turned to the logic "1" level.

Referring temporarily to FIGS. 5 A through E, a numerical example will be illustrated. Decimal six, five, and three (binary 110, 101, and 011) are used as the first through the third input values $X_1$ to $X_3$. Four is selected as the prescribed number of binary bits. The input and the output sequences $X_1$ through $X_3$ and $Y_1$ through $Y_3$ are depicted in the shift registers shown separately at 21 through 23 and 21' through 23', respectively, with the most significant bit of each sequence illustrated nearest to the right margin. The driving and the memory circuits are designated by 65 and 66, respectively.

In FIG. 5 A, the memory circuit 66 is put in the initial state $S_0$. The driving circuit 65 is supplied with the most significant bits of the respective input sequences. All the most significant bits are of the logic "0" level.

In FIG. 5 B, the memory circuit 66 is kept in the initial state $S_0$ because it it impossible to determine the order of the input values by checking the most significant bits. The logic "0" most significant bits are produced as the most significant bits of the respective output sequences and shifted into the shift registers 21' through 23'. In the meantime, the driving circuit 65 is supplied with the next significant bits of the respective input sequences. The next significant bit of only the third input sequence $X_3$ has the logic "0" level. In other words, the driving circuit 65 finds three first-checked parts, each of which consists of the most and the next significant bits of each input sequence. Only the first-checked part of the third input sequence $X_3$ is the logic "0" part $N_3$.

In FIG. 5C, the memory circuit 66 is switched to the fourth first-level state $S_{14}$. The logic "0" next significant bit of the third input sequence $X_3$ is produced as the corresponding bit of the first output sequence $Y_1$. The logic "1" next significant bit of the first or the second input sequences $X_1$ or $X_2$ may be produced as the corresponding bit of whichever of the second and the third output sequences $Y_2$ and $Y_3$. Meanwhile, the driving circuit 65 is supplied with the next less significant bits of the respective input sequences $X_1$ through $X_3$. It is sufficient to check the binary bits of the first and the second input sequences, which are of the logic "1" and the logic "0" levels, respectively. In other words, the remaining parts of the first and the second input sequences are the logic "1" and the logic "0" parts $P_1$ and $N_2$, respectively.

In FIG. 5D, the memory circuit 66 is turned into the fourth second-level state $S_{24}$. The logic "0" binary bit of the first input sequence $X_1$ and the logic "1" binary bit of the second input sequence $X_2$ are produced as the corresponding bits of the first and the second output sequences $Y_1$ and $Y_2$, respectively. The simultaneously produced bit of the third input sequence $X_3$ is merely transmitted as the corresponding bit of the third output sequence $Y_3$. The driving circuit 65 is now supplied with the least significant bits of the respective input sequences. It is no longer necessary to check the least significant bits.

In FIG. 5E, the memory circuit 66 remains in the fourth second-level state $S_{24}$. The least significant bits are transmitted as the corresponding bits of the respective output sequences.

Referring more particularly to FIG. 3(a), the sorting circuit 45 comprises three inverters 68, 68, and 69 for inverting the bits of the respective input sequences $X_1$ through $X_3$ to provide first through third inverted sequences. The memory and the driving units of the first through the sixth blocks 51 to 56 are of the same structure. As depicted in the first block 51, the driving unit comprises first through third NAND gates 71, 72, and 73. The second and the third NAND gates 72 and 73 are preceded by auxiliary NAND gates 74 and 75. The memory unit comprises first and second set-reset flip-flops 76 and 77, each comprising two NAND gates. The first flip-flops, such as 76, in the respective blocks 51 through 56 produce the first-level signals $S_{11}$ through $S_{16}$. The second flip-flops, such as 77, produce the second-level signals $S_{21}$ through $S_{26}$. The reset signal R, the true input sequences $X_1$ through $X_3$, and the inverted sequences are supplied to the driving units of the respective blocks 51 through 56, together with the initial-state signal $S_0$, as indicated by signal lines arranged in the same order. The reset signal R is supplied also to the first and the second flip-flops of the respective blocks 51 through 56. The second and the third NAND gates, such as 72 and 73, of the first through the sixth blocks 51 to 56 are supplied with the respective first-level signals $S_{11}$ through $S_{16}$.

When the reset signal R is given the logic "0" level, all the flip-flops, such as 76 and 77, of the respective blocks 51 through 56 are rendered off. The first-level signals $S_{11}$ through $S_{16}$ are made to have the logic "0" level. The second-level signals $S_{21}$ through $S_{26}$ are also given the logic "0" level. This gives the initial-state signal $S_0$ the logic "1" level. The memory circuit is put in the initial state $S_0$. The driving circuit is now ready for operation. When the logic "1" level is given to the reset signal R, the driving circuit is enabled. Responsive to a combination of binary bits given by $\bar{x}_1\bar{x}_2x_3$, the first NAND gate 71 of the first block 51 renders the first flip-flop 76 on only when the first-checked parts of the respective input signals are a logic "0" part, another logic "0" part, and a logic "1" part $N_1$, $N_2$, and $P_3$, respectively. The driving units of the other blocks 52 through 56 do not turn the respective memory units on. The memory circuit is switched to the first first-level state $S_{11}$.

Supplied with the logic "1" first first-level signal $S_{11}$, the second and the third NAND gates 72 and 73 are enabled only in the first block 51. Responsive to a combination of bits designated by $\bar{x}_1x_2$, the second and the auxiliary NAND gates 72 and 74 turn the second flip-flop 77 on. The auxiliary NAND gate 74 turns the first flip-flop 76 off. The first second-level signal $S_{21}$ is switched to the logic "1" level while the first first-level signal $S_{11}$, to the logic "0" level. Responsive to another combination of bits denoted by $\bar{x}_1x_2$, the third and the auxiliary NAND gates 73 and 75 render the second flip-flop on in the sixth block 56. The auxiliary NAND gate 75 turns the first flip-flop 76 off. The sixth second-level signal $S_{26}$ is given the logic "1" level and the first first-level signal $S_{11}$, the logic "0" level.

Figure 3B:
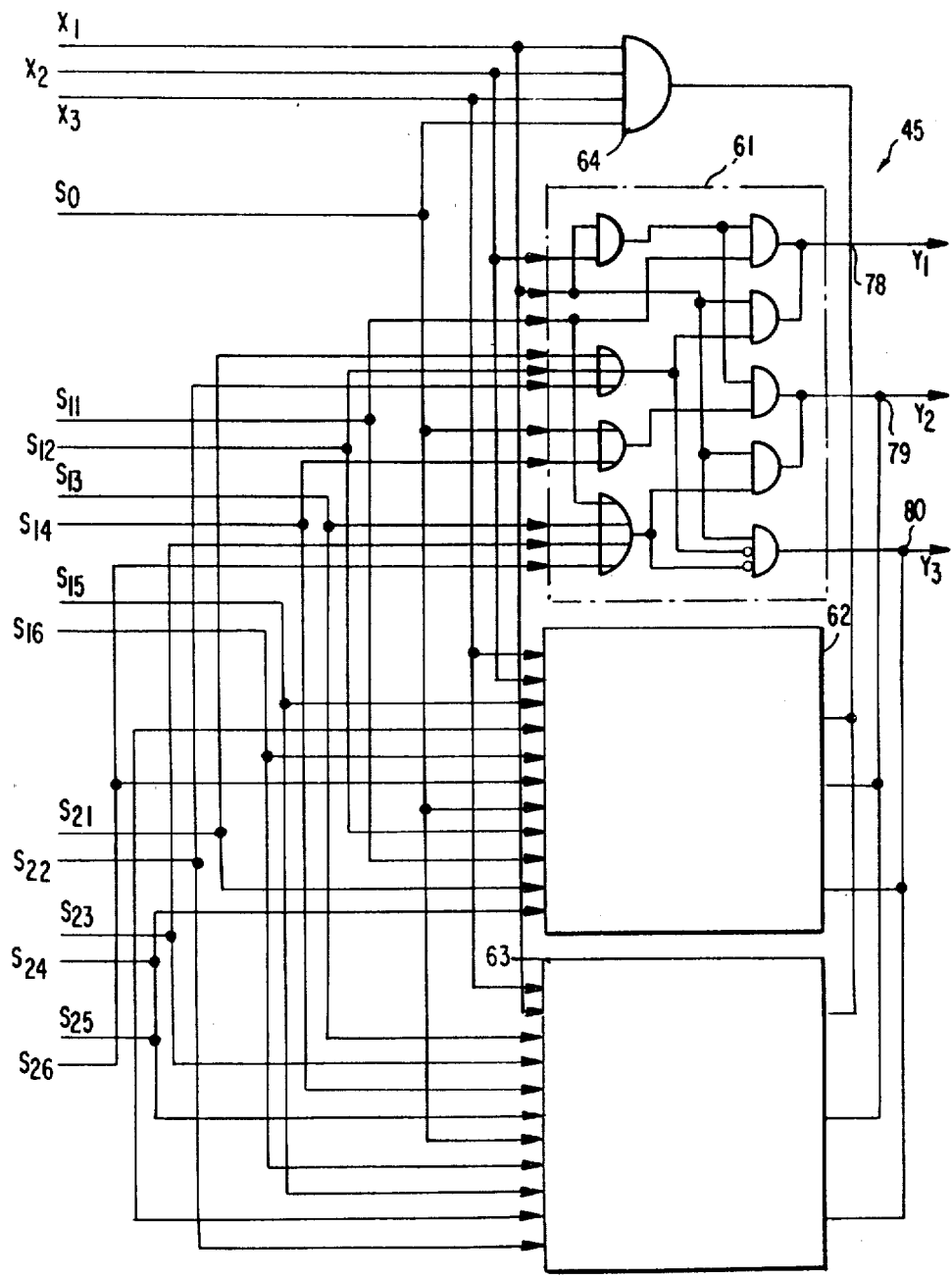

In FIG. 3(b), the first through the third output units 61 to 63 are of the same structure. As shown in the first output unit 61, each output unit comprises AND and OR gates. Such AND and OR gates of the respective output units 61 through 63 are supplied with the input sequences $X_1$ through $X_3$, the initial-state signal $S_0$, and the first-level and the second-level signals $S_{11}$ to $S_{16}$ and $S_{21}$ to $S_{26}$ through signal lines arranged again in the same order. The AND circuit 64 is supplied with the input sequences and the initial-state signal. In combination with the AND circuit 64, the output units 61 through 63 produce the bits of the respective output sequences $Y_1$ through $Y_3$ according to the conditions specified by the initial-state signal $S_0$ and the first-level and the second-level signals $S_{11}$ through $S_{16}$ and $S_{21}$ through $S_{26}$. The bits thus produced are delivered through wired OR's indicated at 78, 79, and 80.

The output circuit produces corresponding bits $y_1$ through $y_3$ of the respective output sequences $Y_1$ through $Y_3$ according to logic formulae:

$$y_1 = x_1x_2x_3S_0 + x_1x_2S_{11} + x_2x_3S_{15} + x_3x_1S_{13} \\ + x_1(S_{12}+S_{21}+S_{22}) + x_2(S_{16}+S_{25}+S_{26}) \\ + x_3(S_{14}+S_{23}+S_{24}), \tag{1}$$

$$y_2 = x_1x_2(S_0+S_{14}) + x_2x_3(S_0+S_{12}) + x_3x_1(S_0+S_{16}) \\ + x_1(S_{11}+S_{13}+S_{23}+S_{26}) \\ + x_2(S_{11}+S_{15}+S_{21}+S_{24}) \\ + x_3(S_{13}+S_{15}+S_{22}+S_{25}) \tag{2}$$

and $$y_3 = x_1(S_0+S_{14}+S_{15}+S_{16}+S_{24}+S_{25}) \\ + x_2(S_0+S_{12}+S_{13}+S_{14}+S_{22}+S_{23}) \\ + x_3(S_0+S_{11}+S_{12}+S_{16}+S_{26}), \tag{3}$$

where $S_0$, $S_{11}$, and others represent the logic "1" signals. When the memory circuit is in the initial state $S_0$, formulae (1) through (3) give the output sequence bits as:

$$Y_1 = x_1x_2x_3, \tag{4}$$

$$y_2 = x_1x_2 + x_2x_3 + x_3x_1, \tag{5}$$

and $$y_3 = x_1 + x_2 + x_3, \tag{6}$$

respectively. When the memory circuit is in the initial state $S_0$ and when $x_1$, $x_2$, and $x_3$ are all logic "1" bits, formulae (4) through (6) give logic "1" bits. If $x_1$, $x_2$, and $x_3$ are all logic "0" bits, formulae (4) through (6) give logic "0" bits.

Let the memory circuit be switched to the first first-level state $S_{11}$. Formulae (1) through (3) give the output sequence bits as:

$$y_1 = x_1 x_2,$$

$$y_2 = x_1 + x_2,$$

and $$y_3 = x_3, \qquad (7)$$

respectively. Formula (7) shows that the bit or bits of the third input sequence $X_3$ are produced as the corresponding bit or bits of the third output sequence $Y_3$. The bit or bits of the first input sequence $X_1$ may be produced as the corresponding bit or bits of whichever of the first and the second output sequences $Y_1$ and $Y_2$. Likewise, the second input sequence bit or bits $x_2$ are produced as the corresponding bit or bits of the remaining one of the first and the second output sequences.

When the memory circuit is further turned into the first second-level state $S_{21}$, formulae (1) through (3) become:

$$y_1 = x_1, \qquad (8)$$

$$y_2 = x_2, \qquad (9)$$

and $$y_3 = x_3, \qquad (10)$$

respectively. Formulae (8) through (10) show that the bits of the first through the third input sequences $X_1$ to $X_3$ are produced as the corresponding bits of the first through the third output sequences $Y_1$ to $Y_3$, respectively. Incidentally, it is possible to assign, for example, the first-level states $S_{11}$ through $S_{16}$ to other orders of the three input values. Such assignments, however, are equivalent to the transitions exemplified above.

Figure 6:
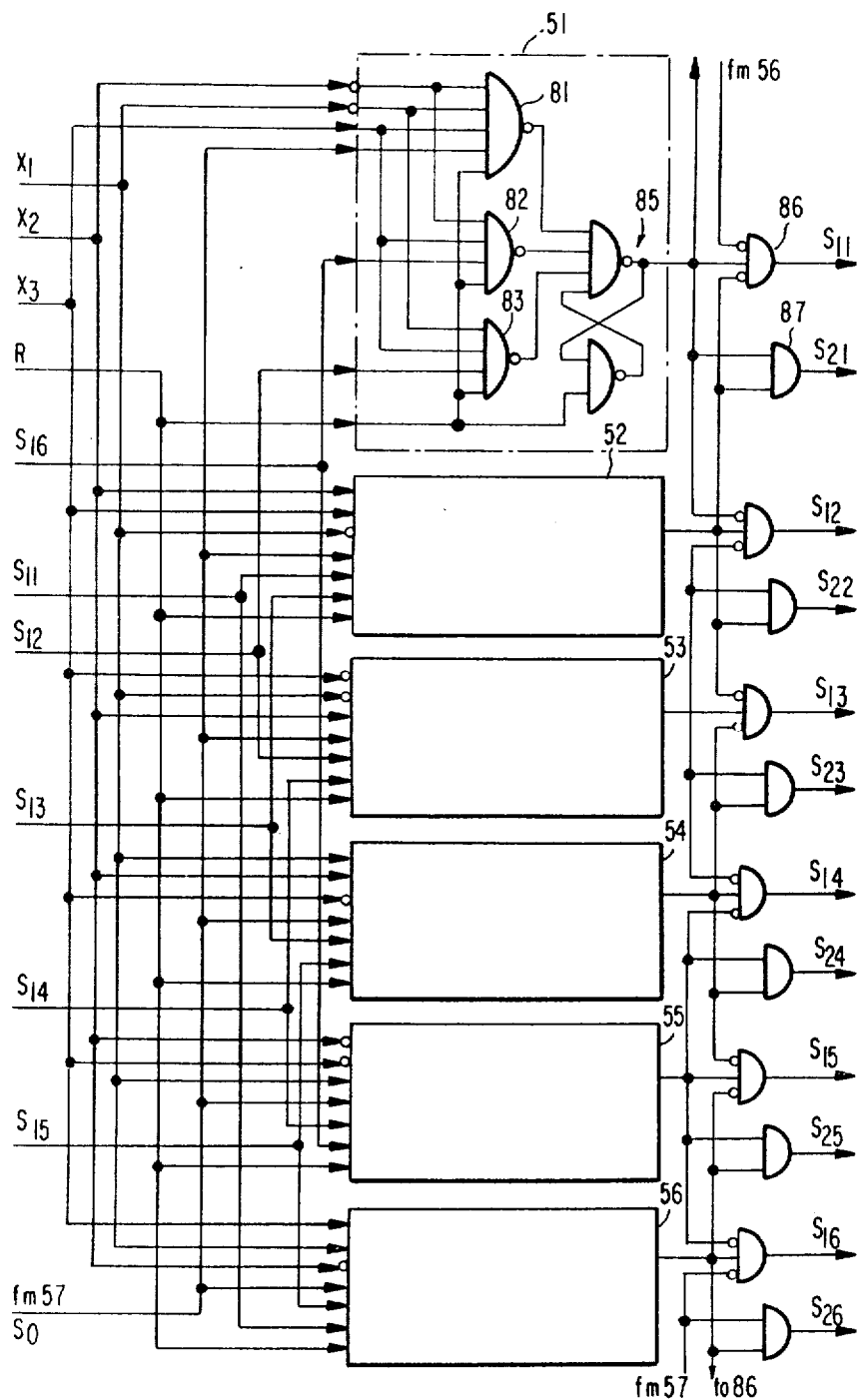
FIG. 6 is a block diagram of a part of a three-input-output sorting circuit according to a modification of the sorting circuit depicted in FIGS. 3(a) and (b)

Referring to FIG. 6, a modification of the ordering circuit arrangement illustrated with reference to FIGS. 3(a) and (b), comprises memory and driving circuits somewhat different from those comprised by the sorting circuit 45. Similar parts are designated by like reference numerals. As depicted in the first block 51, each driving unit comprises first through third NAND gates 81, 82, and 83. Each memory unit comprises a single set-reset flip-flop 85. The first-level and the second-level states $S_{11}$ through $S_{16}$ and $S_{21}$ through $S_{26}$ are specified by various combinations of the on-off states of the flip-flops, such as 85, in the respective blocks 51 through 56 and consequently by various combinations of first through sixth on signals $F_1$ to $F_6$ of such flip-flops. More specifically, the first through the sixth first-level states $S_{11}$ to $S_{16}$ are designated by the first through the sixth logic "1" on signals $F_1$ to $F_6$, respectively. The first through the sixth second-level states $S_{21}$ to $S_{26}$ are indicated when the first and the second on signals $F_1$ and $F_2$, the second and the third on signals $F_2$ and $F_3$, and the like are given the logic "1" level, respectively. The memory circuit is therefore accompanied by first through sixth first-level AND gates and so forth and first through sixth second-level AND gates 87 and so on. Supplied with the sixth, the first, and the second on signals $F_6$, $F_1$, and $F_2$, the first first-level AND gate 86 produces the first first-level signal $S_{11}$. Responsive to the first and the second on signals $F_1$ and $F_2$, the first second-level AND gate 87 produces the first second-level signal $S_{21}$.

In order to simplify the signal lines, the inverters 67 through 69 depicted in FIG. 3(a) are represented by small circles placed on the input sides of the respective blocks 51 through 56. The reset signal R, the true input sequences $X_1$ through $X_3$, and the initial-state signal $S_0$ are supplied to the blocks as indicated by the signal lines depicted in the same order. The first-level signal produced by the flip-flop in each block is supplied to the second NAND gate, such as 82, of the block next preceding in the cyclic order the first-mentioned block and to the third NAND gate, such as 83, of the block next following the first-mentioned block. It is obvious that the memory and the driving circuits shown in FIG. 6 is operable like those described with reference to FIG. 3(a).

Figure 7:
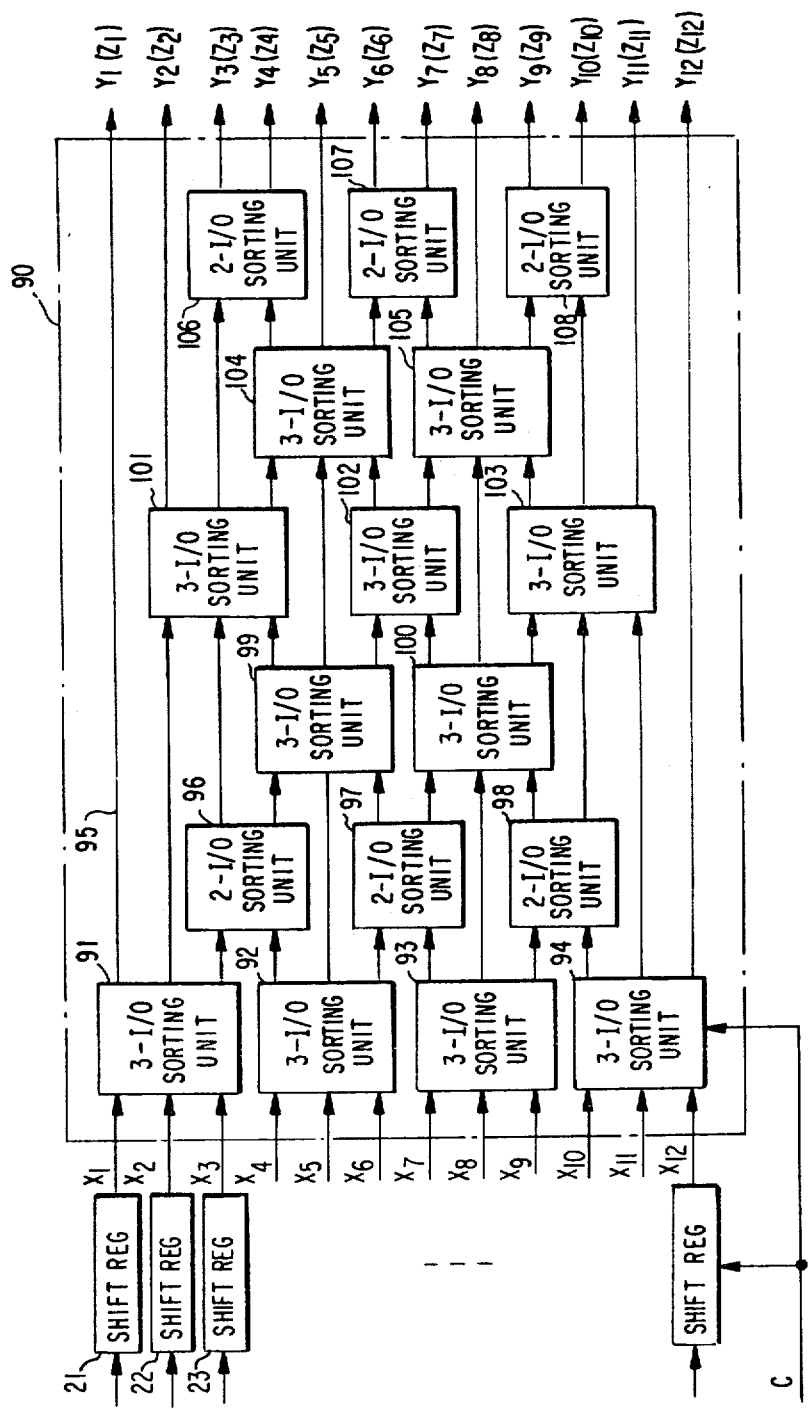
FIG. 7 is a block diagram of a multiple-input-output sorting circuit according to a second embodiment of this invention.

Referring now to FIG. 7, an ordering circuit arrangement according to a second embodiment of this invention is for ordering first through twelfth input values $X_1$ to $X_{12}$ represented by first through twelfth input sequences $X_1$ to $X_{12}$ (the same reference symbols being used) into first through twelfth ascendingly ordered output values $Y_1$ to $Y_{12}$ given by first through twelfth output sequences $Y_1$ to $Y_{12}$. Each input or output sequence is of the type described in conjunction with FIG. 1. The circuit arrangement comprises first through twelfth shift registers 21, 22, 23, and so forth for retaining the respective input sequences at first and a novel twelve-input-output sorting circuit 90. Responsive to clock pulses C of a sequence, twelve corresponding bits of the respective input sequences are concurrently supplied to the sorting circuit 90 at a time from the most significant bits. As will become clear as the description proceeds, the sorting circuit 90 produces first through twelfth intermediate sequences $Z_1$ to $Z_{12}$ at the end of a first cycle equivalent to the prescribed word length multiplied by the number of stages in the sorting circuit 90. The intermediate sequences $Z_1$ through $Z_{12}$ are shifted into the respective shift registers by the clock pulses C during the end portion of the first cycle. Supplied with the intermediate signals $Z_1$ through $Z_{12}$ from the respective shift registers during a second cycle that next follows the first cycle, the sorting circuit 90 produces the output sequences $Y_1$ through $Y_{12}$.

The sorting circuit 90 comprises an array of sorting units arranged in a first through a sixth stage. In the first stage, the array comprises first through fourth first-stage sorting units 91, 92, 93, and 94, each having three input leads and a maximum, a medium, and a miximum output lead depicted from the top to the bottom. Each first-stage sorting unit is preferably either a sorting circuit 45 or that illustrated with reference to FIG. 6 and supplies first-stage output values in the ascending order to the minimum, the medium, and the maximum output leads. Twelves input leads of the first-stage sorting units 91 through 94 are connected to the respective shift registers. Responsive to the first through the third input values $X_1$ to $X_3$ in the first cycle and to the first through the third intermediate sequences in the second cycle, the first first-stage sorting unit 91 produces the first intermediate sequence $Z_1$ and the first output value $Y_1$, respectively, to the minimum output lead indicated at 95. Similarly responsive to the tenth through the twelfth input values $X_{10}$ to $X_{12}$ and the tenth through the twelfth intermediate sequences $Z_{10}$ to $Z_{12}$, the fourth first-stage sorting unit 94 produces the twelfth intermediate sequence $Z_{12}$ and the twelfth output value $Y_{12}$, respectively, to the maximum output lead thereof.

In the second stage, the array comprises first through third second-stage sorting units 96, 97, and 98, each having two input leads and a smaller and a greater value output lead depicted at the top and the bottom. Each second-stage sorting unit may be a two-input-output sorting unit described in conjunction with FIG. 2. Two input leads of each second-stage sorting unit are connected to the maximum output lead of one of the first-stage sorting units 91 through 93 and the minimum output lead of another of the first-stage sorting units 92 through 94 that next follows the first-mentioned first-stage sorting unit in the first stage. Responsive to two first-stage output values, each second-stage sorting unit produces the smaller and the greater of the two as two second-stage output values to the smaller and the greater output lines. In order to establish correct timing between the first-stage and the second-stage sorting units 91 through 94 and 96 through 98, the clock pulses C are supplied to each sorting unit. This applies to each sorting unit of the third through the sixth stages.

In the third stage, the array comprises first and second third-stage sorting units 99 and 100, each being a three-input-output sorting unit of the type used in the first stage. Three input leads of the first third-stage sorting unit 99 are connected to the greater value output lead of the first first-stage sorting unit 96, the medium output lead of the second first-stage sorting unit 97, and the smaller value output lead of the second second-stage sorting unit 97. Three input leads of the second third-stage sorting unit 100 are connected to the greater value output lead of the second second-stage sorting unit 97, the medium output lead of the third first-stage sorting unit 93, and the smaller value output lead of the third second-stage sorting unit 98. Responsive to three input values, each third-stage sorting unit produces three ascendingly ordered output values to the minimum through the maximum output leads.

In the fourth stage, the array comprises first through third fourth-stage sorting units 101, 102, and 103. Each of the first and the third third-stage sorting units 101 and 103 may be a three-input-output sorting unit. The second fourth-stage sorting unit 102 may be a two-input-output sorting unit. Three input leads of the first fourth-stage sorting unit 101 are connected to the medium output lead of the first first-stage sorting unit 91, the smaller value output lead of the first second-stage sorting unit 96, and the minimum output lead of the first third-stage sorting unit 99. Two input leads of the second fourth-stage sorting unit 102 are connected to the maximum output lead of the first third-stage sorting unit 99 and the minimum output lead of the second third-stage sorting unit 100. Three input lead of the third fourth-stage sorting unit 103 are connected to the maximum output lead of the second third-stage sorting unit 100, the greater value output lead of the third second-stage sorting unit 98, and the medium output lead of the fourth first-stage sorting unit 94. Supplied with three input values, each of the first and the third fourth-stage sorting units 101 and 103 produces three ascendingly ordered fourth-stage output values to the minimum through the maximum output leads thereof. Responsive to two input values, the second fourth-stage sorting unit 102 produces the smaller and the greater of the two as two fourth-stage output values to the smaller and the greater value output leads. The minimum output lead of the first fourth-stage sorting unit 101 and the maximum output lead of the third fourth-stage sorting unit 103 give the second intermediate sequence $Z_2$ or the second output value $Y_2$ and the eleventh intermediate sequence $Z_{11}$ or the eleventh output value $Y_{11}$.

In the fifth stage, the array comprises first and second fifth-stage sorting units 104 and 105, each being a three-input-output sorting unit. Three input leads of the first fifth-stage sorting unit 104 are connected to the maximum output lead of the first fourth-stage sorting unit 101, the medium output lead of the first third-stage sorting unit 99, and the smaller value output lead of the second fourth-stage sorting unit 102. Three input leads of the second fifth-stage sorting unit 105 are connected to the greater value output lead of the second fourth-stage sorting unit 102, the medium output lead of the second third-stage sorting unit 100, and the minimum output lead of the third forth-stage sorting unit 103. Each fifth-stage sorting unit produces three ascendingly ordered fifth-stage output values to the minimum through the maximum output leads. The medium output lead of the first and the second fifth-stage sorting units 104 and 105 are used as the fifth intermediate sequence $Z_5$ or the fifth output value $Y_5$ and the eighth intermediate sequence $Z_8$ or the eighth output value $Y_8$.

In the sixth or last stage, the array comprises first through third sixth-stage sorting units 106, 107, and 108, each of which may be a two-input-output sorting unit. Two input leads of the first sixth-stage sorting unit 106 are connected to the medium output lead of the first fourth-stage sorting unit 101 and the minimum output lead of the first fifth-stage sorting unit 104. Two input leads of the second sixth-stage sorting unit 107 are connected to the maximum output lead of the first fifth-stage sorting unit 104 and the minimum output lead of the second fifth-stage sorting unit 105. Two input leads of the third sixth-stage sorting unit 108 are connected to the maximum output lead of the second fifth-stage sorting unit 105 and the medium output lead of the third fourth-stage sorting unit 103. The first through the third sixth-stage sorting units 106 to 108 are for producing the third and the fourth, the sixth and the seventh, and the ninth and the tenth of the intermediate sequences or the output values.

Figure 8:
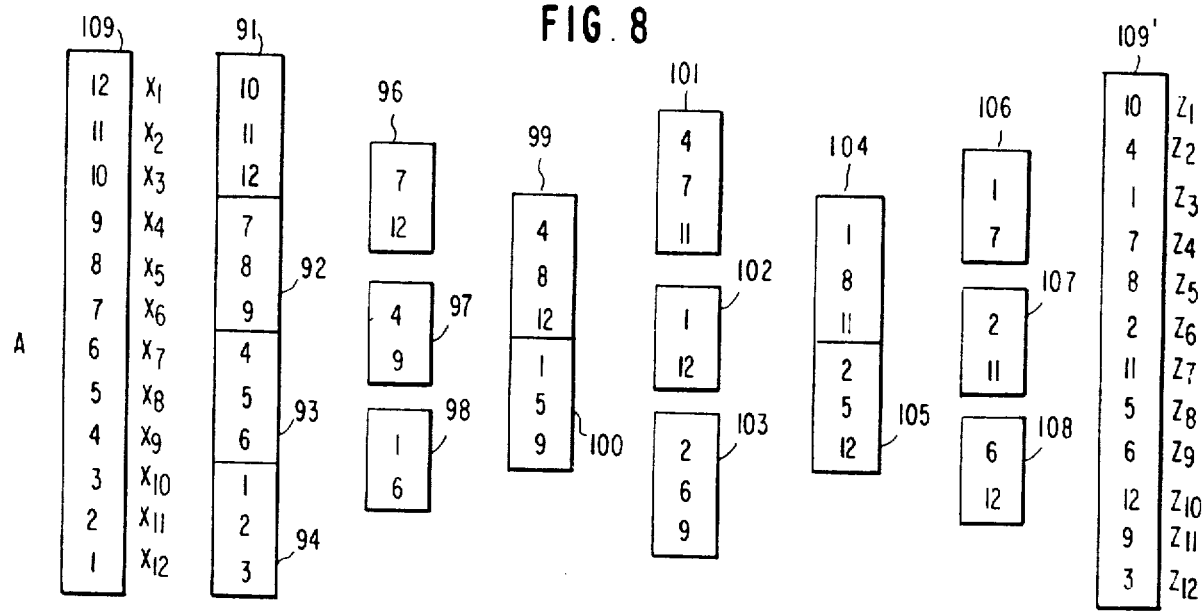
FIGS. 8A and B are schematic diagrams for illustrating operation of the sorting circuit depicted in FIG. 7 by a numerical example.

Turning to FIGS. 8A and B, the shift registers 21, 22, 23, and so on are illustrated for the input values and the intermediate sequences in the first cycle and for the intermediate sequences and the output values in the second cycle separately at 109 and 109', respectively. Numerals 1 through 12 depicted in the shift registers 109 and 109' are indicative of the ordinal numbers for the ascendingly ordered input, intermediate, and output values. The first-stage through the sixth-stage output values are shown in blocks 91 through 94, 96 through 98, 99 and 100, 101 through 103, 104 and 105, and 106 through 108 representative of the respective sorting units. It is evident that the input values retained at first in the shift registers 109 (FIG. 8A) at random are sorted into the output values at the end of the second cycle as shown in the shift registers 109' (FIG. 8B) in the ascending order.

Figure 9:
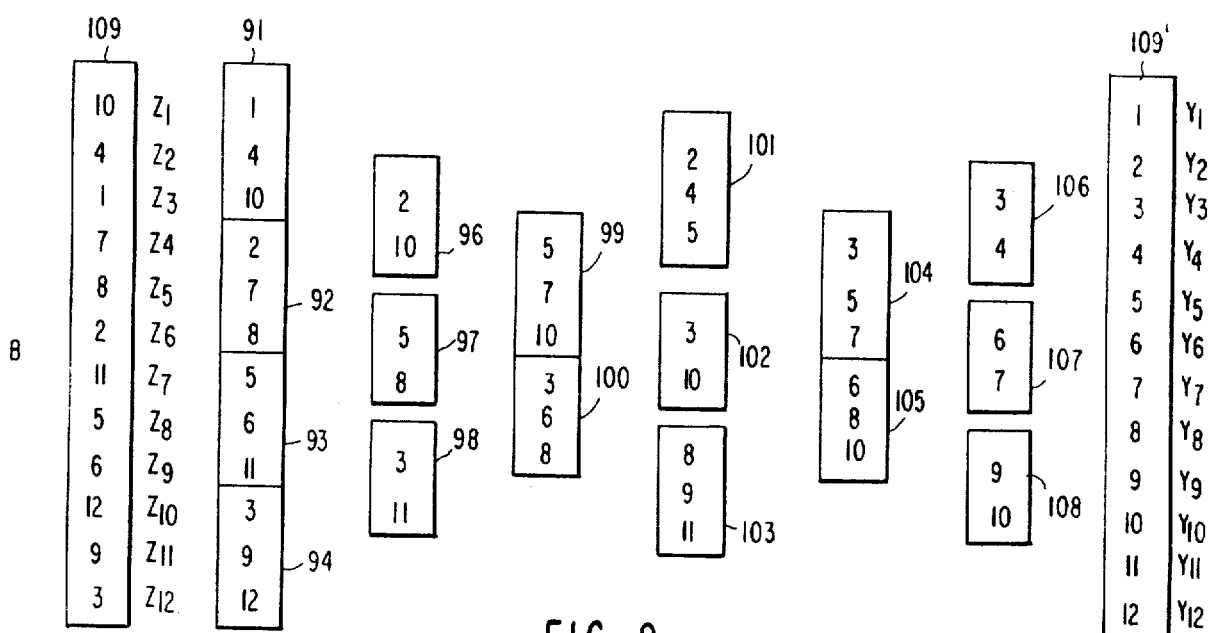
FIG. 9 is a block diagram of a multiple-input-output sorting circuit according to a modification of the sorting circuit illustrated in FIG. 7.
Figure 9:
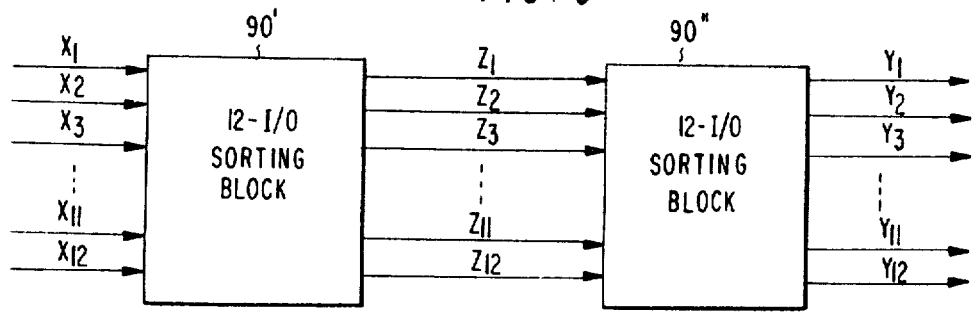

Referring to FIG. 9, a modification of the ordering circuit arrangement illustrated with reference to FIG. 7 and FIGS. 8A and B, comprises first and second twelve-input-output sorting blocks 90' and 90". Each of the blocks 90' and 90" may be of the structure described as regards the sorting circuit 90. The sorting block 90' is operable as described with reference to FIG. 8A to produce the intermediate sequences $Z_1$ through $Z_{12}$. Responsive to the intermediate sequences, the second sorting block 90" provides the output values $Y_1$ through $Y_{12}$. It is possible to understand that the array of sorting units is divided into the blocks 90' and 90" at first and then into the stages.

Figure 10:
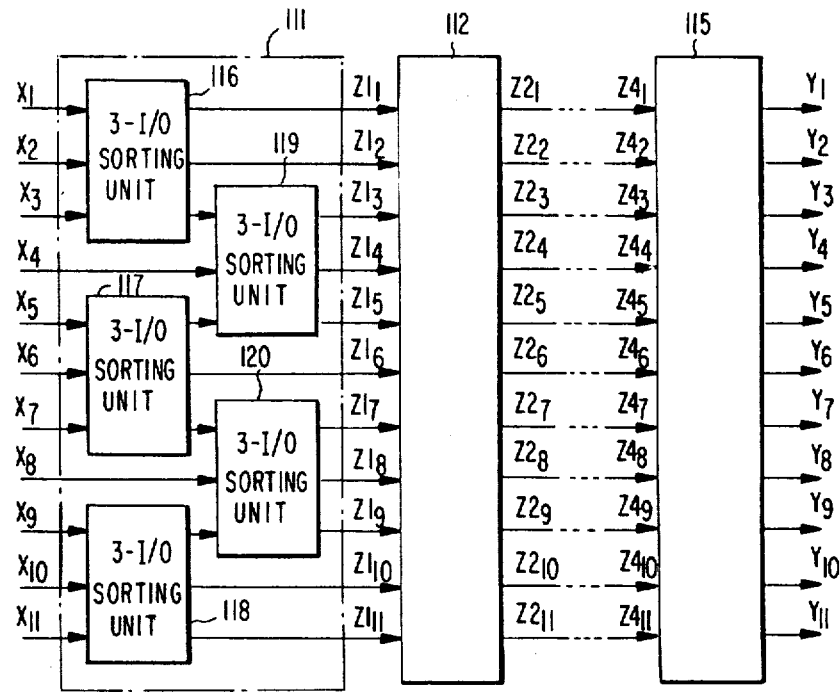
FIG. 10 is a block diagram of a multiple-input-output sorting circuit according to a third embodiment of this invention.

Referring to FIG. 10, an ordering circuit arrangement according to a third embodiment of this invention is for ordering first through eleventh input values $X_1$ to $X_{11}$ into first through eleventh output values $Y_1$ to $Y_{11}$, all of the type described in connection with FIG. 7. The circuit arrangement comprises the shift registers 21, 22, 23, and others as in FIG. 6 and a sorting circuit comprising first through fifth sorting blocks 111, 112, . . . , and 115 connected in cascade. The first through the fourth blocks 111 and others are of the same structure and for providing first through eleventh first-block intermediate values $Z1_1$ to $Z1_{11}$, first through eleventh second-block intermediate values $Z2_1$ to $Z2_{11}$, . . . , and first through eleventh fourth-block intermediate values $Z4_1$ to $Z4_{11}$, respectively. The fifth block 115 is also of the same structure and provides the output values $Y_1$ to $Y_{11}$.

As depicted in the first sorting block 111, each sorting block comprises a first and a second stage of three-input-output sorting units of the type described in connection with FIGS. 3 A and B. The first stage comprises first through third sorting units 116, 117, and 118 and the second stage, first and second sorting units 119 and 120.

For the first stage of each block, three input leads of the first sorting unit 116 are supplied with the first through the third of the values supplied to the block under consideration, such as $X_1$ to $X_3$ or $Z1_1$ to $Z1_3$. Three input leads of the second sorting unit 117 are supplied with the fourth through the seventh of the values supplied to the block, such as $X_4$ to $X_7$. Three input leads of the third sorting unit 118 are supplied with the ninth through the eleventh of the values supplied to the block in question, such as $X_9$ to $X_{11}$. The minimum and the medium output values of the first sorting unit 116, the medium output value of the second sorting unit 117, and the medium and the maximum output values of the third sorting unit 118 are used as the first, the second, the sixth, the tenth, and the eleventh of the values provided by the block in question, such as $Z1_1$, $Z1_2$, $Z1_6$, $Z1_{10}$, and $Z1_{11}$ or $Y_1$, $Y_2$, $Y_6$, $Y_{10}$, and $Y_{11}$.

For the second stage of each block, three input leads of the first sorting unit 119 are supplied with the maximum output value of the first first-stage sorting unit 116, the fourth of the values supplied to the block under consideration, such as $X_4$ or $Z1_4$, and the minimum output value of the second first-stage sorting unit 117. Three input leads of the second sorting unit 120 are supplied with the maximum output value of the second first-stage sorting unit 117, the eighth of the values supplied to that block, such as $X_8$, and the minimum output value of the third first-stage sorting unit 118. The ascendingly ordered output values of the first and the second sorting units 119 and 120 are used as the third, the fourth, the fifth, the seventh, the eighth, and the ninth of the values produced by the block in question, such as $Z1_3$, $Z1_4$, $Z1_5$, $Z1_7$, $Z1_8$, and $Z1_9$ or $Y_3$, $Y_4$, $Y_5$, $Y_7$, $Y_8$, and $Y_9$.

It will readily be possible by the use of a figure similar to that illustrated in FIGS. 8A and B to understand operation of the sorting circuit comprising the five sorting blocks 111 through 115. In a modification, the sorting circuit may comprise only one sorting block, such as 111, repeatedly used to provide in five cycles the output values of the type described in connection with FIG. 10 as the block intermediate values and the output values $Y_1$ through $Y_{11}$.

Figure 11:
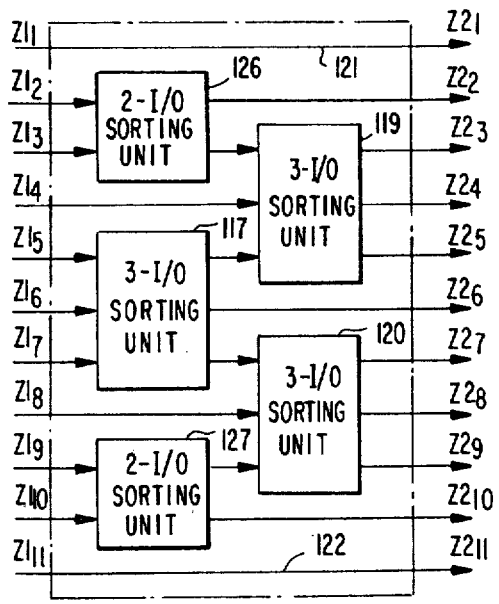
FIG. 11 is a block diagram of a part of a multiple-input-output sorting circuit according to a modification of the sorting circuit depicted in FIG. 9.

Turning to FIG. 11, another modification of the ordering circuit arrangement illustrated with reference to FIG. 10, comprises a modified block as each of the even-numbered sorting blocks, such as the second block 92. The modified block again comprises a first and a second stage of sorting units. It is to be noted as regards the sorting circuit described in conjunction with FIG. 10 that the first, the second, the tenth, and the eleventh of the values supplied to each even-numbered block, such as $Z1_1$, $Z1_2$, $Z1_{10}$, and $Z1_{11}$, are used as the first, the second, the tenth, and the eleventh of the values provided by that block, such as $Z2_1$, $Z2_2$, $Z2_{10}$, and $Z2_{11}$, respectively, without changing the order. The modified block therefore comprises two mere connections 121 and 122 for the first and the eleventh values with two two-input-output sorting units 126 and 127 substituted for the first and the third first-stage sorting units 116 and 118 (FIG. 10). In other respects, the modified block is of the structure used in each odd-numbered sorting blocks 111 or 115 (FIG. 10). Inasmuch as the array comprises a plurality of two-input-output sorting units and a plurality of three-input-output sorting units, it is possible to understand that the sorting circuit herein described is a modification of the sorting circuit illustrated with reference to FIG. 7.

Referring to FIG. 12, a four-input-output sorting unit is for providing first through fourth ascendingly ordered output values $Y_1$ to $Y_4$ in response to a first set of ascendingly ordered first and second input values $A_1$ and $A_2$ and a second set of first and second ascendingly ordered input values $B_1$ and $B_2$. The sorting unit comprises first and second two-input-output sorting units 131 and 132 of the type illustrated with reference to FIG. 2. Two input leads of the first sorting unit 131 are supplied with the first input values $A_1$ and $B_1$ of the respective sets. Two input leads of the second sorting unit 132 are supplied with the second input values $A_2$ and $B_2$. The smaller output value of the first sorting unit 131 and the greater output value of the second sorting unit 132 are used as the first and the fourth output values $Y_1$ and $Y_4$, respectively. The sorting unit further comprises a third two-input-output sorting unit 133 responsive to the greater output value of the first sorting unit 131 and the smaller output value of the second sorting unit 132 for providing the second and the third output values $Y_2$ and $Y_3$ by the smaller and the greater output values thereof, respectively. It is possible to supply the four input values with the first and the second sets interchanged.

Figure 13:
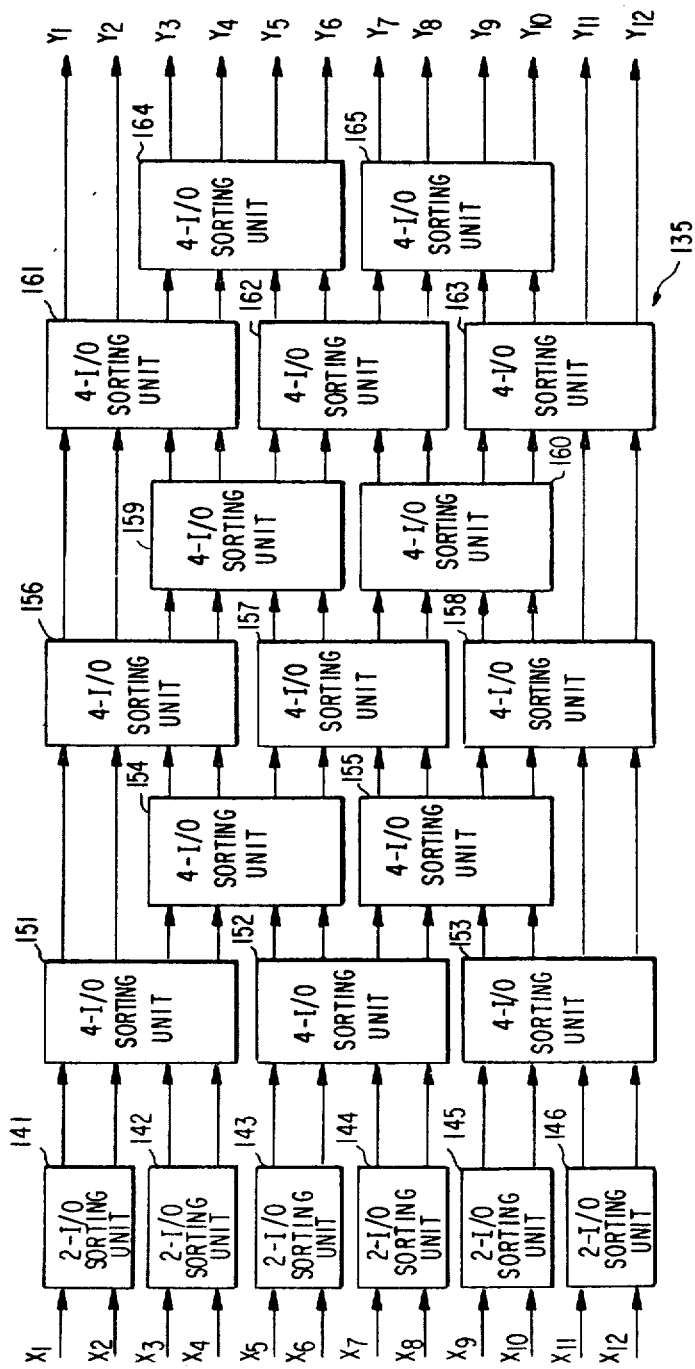
FIG. 13 is a block diagram of a multiple-input-output sorting circuit according to a fourth embodiment of this invention.

Referring now to FIG. 13, an ordering circuit arrangement according to a fourth embodiment of this invention is again for ordering first through twelfth input values $X_1$ to $X_{12}$ into first through twelfth output values $Y_1$ to $Y_{12}$, all of the type described in conjunction with FIGS. 3(a) and (b) and FIG. 7. The circuit arrangement comprises the shift registers 21, 22, 23, and so forth as depicted in FIG. 7 and a sorting circuit 135 comprising first through sixth two-input-output sorting units 141, 142, 143, 144, 145, and 146 of the type illustrated with reference to FIG. 2. The sorting units 141 through 146 are supplied with the respective input sequences. The sorting circuit 135 further comprises an array of four-input-output sorting units of the type described with reference to FIG. 12. The latter sorting units are arranged in the array in a first through a sixth stage.

In the first stage, the array comprises first through third sorting units 151, 152, and 153. The first sorting unit 151 is supplied with the smaller and the greater output values of the first two-input-output sorting unit 141 as the smaller and the greater input values of the first set and with the smaller and the greater output values of the second two-input-output sorting unit 142 as the smaller and the greater input values of the second set. The second and the third sorting units 152 and 153 are similarly connected to the third through the sixth two-input-output sorting units 143 to 146.

In the second stage, the array comprises first and second sorting units 154 and 155. The first sorting unit 154 is supplied with the third and the fourth output values of the first first-stage sorting unit 151 as the smaller and the greater input values of the first set and with the first and the second output values of the second first-stage sorting unit 152 as the smaller and the greater input values of the second set. The second sorting unit 155 is likewise connected to the second and the third first-stage sorting units 152 and 153.

In the third stage, the array comprises first through third sorting units 156, 157, and 158. The first sorting unit 156 is supplied with the first and the second output values of the first first-stage sorting unit 151 as the smaller and the greater input values of the first set and with the first and the second output values of the first second-stage sorting unit 154 as the smaller and the greater input values of the second set. The second sorting unit 157 is supplied with the third and the fourth output values of the first second-stage sorting unit 154 as the smaller and the greater input values of the first set and with the first and the second output values of the second second-stage sorting unit 155 as the smaller and the greater input values of the second set. The third sorting unit 158 is supplied with the third and the fourth output values of the second second-stage sorting unit 155 as the smaller and the greater input values of the first set and with the third and the fourth output values of the third first-stage sorting unit 153 as the smaller and the greater input values of the second set.

In the fourth stage, the array comprises first and second sorting units 159 and 160. In the fifth stage, the array comprises first through third sorting units 161, 162, and 163. In the sixth stage, the array comprises first and second sorting units 164 and 165. The sorting units 159 and 160 of the fourth stage and the sorting units 164 and 165 of the sixth stage are connected to the sorting units of the smaller-numbered stages, respectively, like the sorting units 154 and 155 of the second stage. The sorting units 161 through 163 of the fifth stage are connected to the sorting units 156 and 158 of the third stage and to the sorting units 159 and 160 of the fourth stage like the sorting units 156 through 158 of the third stage. The first and the second output values of the first fifth-stage sorting units 161, the first through the fourth output values of the first and the second sixth-stage sorting units 164 and 165, and the third and the fourth output values of the third fifth-stage sorting unit 163 are used as the first through the twelfth outputs $Y_1$ to $Y_{12}$, respectively.

Turning to FIG. 15, the shift registers 21, 22, 23, and so forth are depicted for the input values $X_1$ through $X_{12}$ and the output values $Y_1$ through $Y_{12}$ separately at 169 and 169', respectively, as in FIGS. 5A through E and FIGS. 3A and B. Numerals depicted in the shift registers 169 and 169' are indicative of the ordinal numbers for the ascendingly ordered input or output values. The two-input-output sorting unit output values and the four-input-output sorting unit output values are written in blocks 141 through 146 and 151 through 165 representative of the respective sorting units. With such a figure, it is evident that an array of a sorting circuit for 4n input values, where n represents a natural number except for unity, should comprise a plurality of four-input-output sorting units arranged in 2n stages. Each odd-numbered stage should comprise n sorting units and each even-numbered stage, (n−1) sorting units. The general term expressed in n is applicable even when n represents unity. In this event, the array comprises zero sorting unit in the second stage and consequently no second and higher stages but only one sorting unit in the first stage alone.

Finally referring to FIG. 15, a two-input-output sorting circuit is operable in bit parallel rather than in bit series. Input values are designated by $X_1$ and $X_2$. The sorting circuit comprises a comparator 170 for comparing the input values with each other and for producing a one-bit control signal with one and the other of the logic "0" and the logic "1" level given thereto when one input value $X_1$ is smaller and greater than the other input value $X_2$, respectively. Responsive to the control signal, first and second selectors 171 and 172 supply the smaller and the greater of the input values to the smaller and the greater value output leads, respectively. It is possible to use such two-input-output sorting units in the four-input-output sorting unit illustrated with reference to FIG. 12 and accordingly in the multiple-input-output ordering circuit arrangement illustrated with reference to FIG. 13. In each event, each signal lead depicted by a single line should comprise a plurality of leads for a bit-parallel sequence. The time required to provide the output values is thereby astonishingly reduced.

While this invention has thus far been described in conjunction with a few embodiments thereof together with several modifications, it is obvious that this invention can be carried into effect in various other manners. Above all, all the ordering circuit arrangements according to this invention are readily manufactured by resorting to the circuit integration techniques for semiconductor devices. Numerical values given in any number system are readily converted into the binary sequences of the type described. The number of input values is readily adjusted to the number designed for such an ordering circuit arrangement.

What is claimed is:

1. A sorting circuit for sorting three input values into first through third ascendingly ordered output values, said input values being represented by three input sequences, respectively, said first through said third output values being represented by first through third output sequences, respectively, each of said input and said output sequences being a time sequence having a prescribed number of binary bits arranged from the most significant bit to the least significant bit, said input and said output sequences thereby having corresponding bits, each binary bit having either of a logic "0" and a logic "1" level at a time, said sorting circuit comprising:

state specifying means for specifying any one of an initial state, six first-level states, and six second-level states at a time, each first-level state being accompanied by two second-level states with said two second-level states assigned to two first-level states including said each first-level state, respectively, so that each second-level state may indicate a particular order among said input values, said initial state being a state in which the order of said input values is not yet definite, each first-level state being another state in which the order is determined for only one input value, each of the two second-level states accompanying the last-mentioned first-level state being still another state in which the order is determined for two input values except for said only one input value;

means for resetting said state specifying means into said initial state;

checking and driving means coupled to said state specifying means for checking three corresponding bits of the respective input sequences from time to time to drive, when only one bit is checked to have one of the logic "0" and the logic "1" levels with the two binary bits corresponding thereto checked to have the other of the logic "0" and the logic "1" level for the first time after said state specifying means is reset into said initial state, said state specifying means from said initial state to one of said first-level states that is predetermined according to the input sequence in which said only one bit is present, said checking and driving means subsequently driving said state specifying means from said one first-level state to one of the two second-level states accompanying said one first-level state when a particular bit and the binary bit corresponding thereto of two input sequences except for the input sequence in which said only one bit is present are checked to have a predetermined one and the other of the logic "0" and the logic "1" levels, respectively, for the first time after said state specifying means is driven to said one first-level state; and an output circuit coupled to said state specifying means for arranging said input sequences into said first through said third output sequences according to said initial state, said one first-level state, and said one second-level state.

2. A sorting circuit as claimed in claim 1, wherein said output circuit comprises output producing means responsive to each of said initial, said first-level, and said second-level states for producing as said first output sequence a first of said input sequences in which said only one bit is present, for producing as said second output sequence a second of said input sequences in which the logic "0" level is had by one of said particular bit and the binary bit corresponding thereto, and for producing as said third output sequence a third of said input sequences in which the logic "1" level is had by the other of said particular bit and the binary bit corresponding thereto, when said only one bit has the logic "0" level, said output producing means producing said third, said second, and said first input sequences as said first through said third output sequences, respectively, when said only one bit has the logic "1" level.

3. A sorting circuit as claimed in claim 2, wherein: said state specifying means comprises level giving means for giving the logic "1" level to an initial-state signal $S_0$ when said state specifying means is put in said initial state a first first-level signal $S_{11}$ when one input value $X_1$ and another input value $X_2$ are smaller than still another input value $X_3$, a second first-level signal $S_{12}$ when the input value $X_1$ is the smallest of said three input sequences, a third first-level signal $S_{13}$ when the input value $X_2$ is the largest of said three input sequences, a fourth first-level signal $S_{14}$ when the input value $X_3$ is the smallest of said three input sequences, a fifth first-level signal $S_{15}$ when the input value $X_1$ is the largest of said three input sequences, a sixth first-level signal $S_{16}$ when the input value $X_2$ is the smallest of said three input sequences, a first second-level signal $S_{21}$ when the input values $X_3$ and $X_1$ are greater and smaller than the input value $X_2$, respectively, a second second-level signal $S_{22}$ when the input values $X_1$ and $X_2$ are smaller and greater than the input value $X_3$, respectively, a third second-level signal $S_{23}$ when the input values $X_2$ and $X_3$ are greater and smaller than the input value $X_1$, respectively, a fourth second-level signal $S_{24}$ when the input values $X_3$ and $X_1$ are smaller and greater than the input value $X_2$, respectively, a fifth second-level signal $S_{25}$ when the input values $X_1$ and $X_2$ are greater and smaller than the input value $X_3$, respectively, and a sixth second-level signal $S_{26}$ when the input values $X_2$ and $X_3$ are smaller and greater than the input value $X_1$, respectively, said level giving means otherwise giving the logic "0" level to said initial-state, said first-level, and said second-level signals;

said output producing means comprising means supplied with said input sequences and said initial-state, said first-level, and said second-level signals for producing corresponding input sequence bits $x_1$, $x_2$, and $x_3$ for the respective input values $X_1$, $X_2$, and $X_3$ as corresponding bits $y_1$, $y_2$, and $y_3$ of said first through said third output sequences according to logic formulae:

$y_1 = x_1x_2x_3S_0 + x_1x_2S_{11}$
$x_2x_3S_{15} + x_3x_1S_{13} + x_1(S_{12} + S_{21}$
$S_{22}) + x_2(S_{16} + S_{25} + S_{26}) + x_3(S_{14} + S_{23} + S_{24})$, $y_2 = x_1x_2(S_0 + S_{14}) + x_2x$
$_3(S_0 + S_{12}) + x_3x_1(S_0 + S_{16}) + x_1(S_{11}$
$+ S_{13} + S_{23} + S_{26}) + x_2(S_{11} + S_{15} + S_{21}$
$+ S_{24}) + x_3(S_{13} + S_{15} + S_{22} + S_{25})$, and $y_3 = x_1(S_0 + S_{14} + S_{15} + S_{16}$
$+ S_{24} + S_{25}) + x_2(S_0 + S_{12} + S_{13} + S_{14}$
$+ S_{22} + S_{23}) + x_3(S_0$
$+ S_{11} + S_{12} + S_{16} + S_{21} + S_{26})$.

4. A sorting circuit for sorting n circuit input values into first through n-th ascendingly ordered circuit output values where n represents a predetermined natural number, said input values being represented by n input sequences, respectively, said first through said n-th output values being represented by first through n-th output sequences, respectively, each of said input and said output sequences being a time sequence of a prescribed number of binary bits arranged from the most significant bit to the least significant bit, each binary bit having either of a logic "0" and a logic "1" level at a time, said sorting circuit comprising:

an array of a plurality of first-kind sorting units and a plurality of second-kind sorting units, said first-kind and said second-kind sorting units being connected to one another according to a predetermined rule, each first-kind sorting unit having two input leads and a smaller and a greater value output lead and being responsive to two unit input values supplied to the respective input leads for supplying the smaller and the greater value output leads with the smaller and the greater of the two unit input values in a period related to said prescribed number, each second-kind sorting unit having three input leads and a minimum, a medium, and a maximum output lead and being responsive to three unit input values supplied to the three input leads, respectively for supplying the minimum, the maximum, and the medium output leads in said period with the minimum and the maximum of the three unit input values and a remaining one of the three unit input values, respectively;

first means for supplying the respective input sequences bit by bit to prescribed ones of said second-kind sorting units; and second means connected to prescribed ones of the smaller and the greater value output leads of said first-kind sorting units and to prescribed ones of the minimum, the medium, and the maximum output leads of said second-kind sorting units for producing bit by bit n output sequences.

5. A sorting circuit as claimed in claim 4, further comprising a plurality of shift registers for retaining the respective input sequences at first;

said first means comprising means for supplying clock pulses to said shift registers to make said shift registers supply the respective input sequences bit by bit to said prescribed second-kind sorting units;

said second means comprising:

means connected to said prescribed smaller and greater value output leads and to said prescribed minimum, medium, and maximum output leads for producing intermediate sequence bit by bit in response to the input sequences supplied to said prescribed second-kind sorting units;

means for substituting said intermediate sequences in said shift registers for said input sequences;

means for supplying said clock pulses to said shift registers to make said shift registers supply said intermediate sequences to said prescribed second-kind sorting units; and means connected to said prescribed smaller and greater value output leads and to said prescribed minimum, medium, and maximum output leads for producing said output sequences in response to the intermediate sequences supplied to said prescribed second-kind sorting units.

6. A sorting circuit as claimed in claim 4, further comprising a plurality of shift registers for retaining the respective input sequences at first;

said first means comprising means for supplying clock pulses to said shift registers to make said shift registers supply the respective input sequences bit by bit to said prescribed second-kind sorting units;

said second means comprising:

means connected to said prescribed smaller and greater value output leads and to said prescribed minimum, medium, and maximum output leads for successively producing bit by bit first through m-th intermediate sequences in response to said input sequences, where m represents a preselected natural number;

means for substituting said first through said intermediate sequences in said shift registers cessively for said input sequences;

means for supplying said clock pulses to said registers to make said shift registers seccess supply said first through said m-th interme sequences to said prescribed second-kind so units; and means connected to said prescribed smaller greater value output leads and to said presc minimum, medium, and maximum output lead producing bit by bit said output sequences i sponse to the m-th intermediate sequences mately supplied to said prescribed second sorting units.

7. A sorting circuit as claimed in claim 4, wherein N output sequences are fed to said first means.

8. A sorting circuit for sorting 4n circuit input v. into first through 4n-th ascendingly ordered o values where n represents a natural number excep unity, said input values being represented by 4n i sequences, respectively, said first through said output values being represented by first through output sequences, respectively, each of said input said output sequences being a sequence of a presci number of binary bits arranged from the most sig cant bit to the least significant bit, each binary bit ing either of a logic "0" and a logic "1" level, said ing circuit comprising:

2n two-input-output sorting units, each having input leads and a smaller and a greater value o lead and being responsive to two unit input v supplied to the respective input leads for suppl the smaller and the greater value output leads the smaller and the greater of the two unit i values;

means for supplying the respective circuit input ues to said two-input-output sorting units as unit input values thereof;

an array of a plurality of four-input-output so units, each having a smaller and a greater v input lead of a first set, a smaller and a greater v input lead of a second set, and first through fo output leads, the sorting units in said array b arranged in first through 2n-th stages, each numbered stage comprising first through n-th 1 input-output sorting units, each even-numb stage comprising first through (n−1)-th four-ir output sorting units, the smaller and the gr value input leads of the first-stage sorting being connected to the smaller and the gr value output leads of said two-input-output so units, respectively, the first-set smaller and gr value input leads and the second-set smaller greater value input leads of a p-th q-th-stage so unit, where p represents each of natural num between one and (n−1), both inclusive, and w q represents an even number between two anc both inclusive, being connected to the third anc fourth output leads of the p-th (q−1)-th-stage ing unit and the first and the second output lea the (p+1)-th (q−1)-th-stage sorting units, res tively, the first-set smaller and greater value i leads and the second-set smaller and greater v input leads of the first r-th-stage sorting unit, w r represents an odd number between three (2n−1), both inclusive, being connected to the and the second output leads of the first (r−2 stage sorting unit and the first and the second output leads of the second $(r-1)$-th-stage sorting unit, respectively, the first-set smaller and greater value input leads and the second-set smaller and greater value input leads of the n-th r-th-stage sorting unit being connected to the third and the fourth output leads of the $(n-1)$-th $(r-1)$-th-stage sorting unit and the third and the fourth output leads of the n-th $(r-2)$-th-stage sorting unit, respectively, the first-set smaller and greater value input leads and the second-set smaller and greater value input leads of an s-th r-th-stage sorting unit, where s represents each of natural numbers between one and $(n-1)$, both inclusive, being connected to the third and the fourth output leads of the $(s-1)$-th $(r-1)$-th-stage sorting unit and the first and the second output leads of the s-th $(r-1)$-th-stage sorting unit, respectively, each four-input-output sorting unit thereby supplying the values supplied to the four input leads thereof to the first through the fourth output leads thereof in the ascending order; and means for producing said first through said 4n-th output values from the first and the second output leads of the first $(2n-1)$-th-stage sorting unit, the first through the fourth output leads of the first through the $(n-1)$-th 2n-th-stage sorting units, and the third and the fourth output leads of the 2n-th $(n-1)$-th-stage sorting units, respectively.

* * * * *

UNITED STATES PATENT AND TRADEMARK OFFICE
CERTIFICATE OF CORRECTION

PATENT NO. : 4,410,960
DATED : October 18, 1983    Page 1 of 2
INVENTOR(S) : Yoshihiro KASUYA It is certified that error appears in the above-identified patent and that said Letters Patent is hereby corrected as shown below:

Column 6, line 67, after "only" (first occurrence), change "the" to --one--.

Column 7, line 13, after "1", change "parts" to --part--;
        line 43, after "first", change "lhrough" to --through--.

Column 8, line 28, after "$Y_2$", insert a --,--.

Column 10, line 17, after "by", change "$\bar{x}_1 x_2$" to --$x_1 \bar{x}_2$--;
         line 56, after "$S_{16}$", insert --$+S_{21}$--.

Column 12, line 56, after "a" (first occurrence), delete "maximum, a medium, and a miximum" and insert --minimum, a medium, and a maximum--;
         line 62, before "input", change "Twelves" to --Twelve--.

Column 13, line 59, after "input", change "lead" to --leads--.

UNITED STATES PATENT AND TRADEMARK OFFICE
CERTIFICATE OF CORRECTION

PATENT NO. : 4,410,960
DATED : October 18, 1983         Page 2 of 2
INVENTOR(S) : Yoshihiro KASUYA It is certified that error appears in the above-identified patent and that said Letters Patent is hereby corrected as shown below:

Column 14, line 22, after "third", change "forth-stage" to --fourth stage--.

Column 18, line 1, change "Fig. 15" to --Fig. 14--;
line 5, after "FIGS.", change "3A" to --8A--.

Column 20, line 40, after "$S_{11}$", insert --+--;
line 41, after "$S_{21}^{11}$", insert --+--.

Column 21, line 38, after "intermediate", change "sequence" to --sequences--.

Column 22, line 5, after "registers" (second occurrence), change "seccessively" to --successively--.

Signed and Sealed this

Eighteenth Day of December 1984

[SEAL]

Attest:

Attesting Officer

GERALD J. MOSSINGHOFF
Commissioner of Patents and Trademarks